No. 639,551. Patented Dec. 19, 1899.
F. L. FULLER.
WEIGHING SCALE AND VALUE CALCULATING AND REGISTERING MECHANISM.
(Application filed Feb. 6, 1894. Renewed Nov. 10, 1898.)
(No Model.) 4 Sheets—Sheet 1.
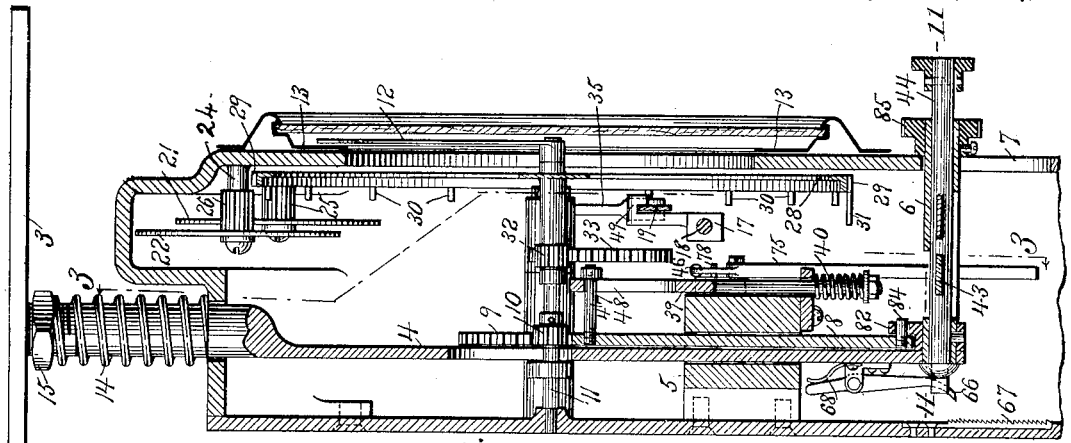
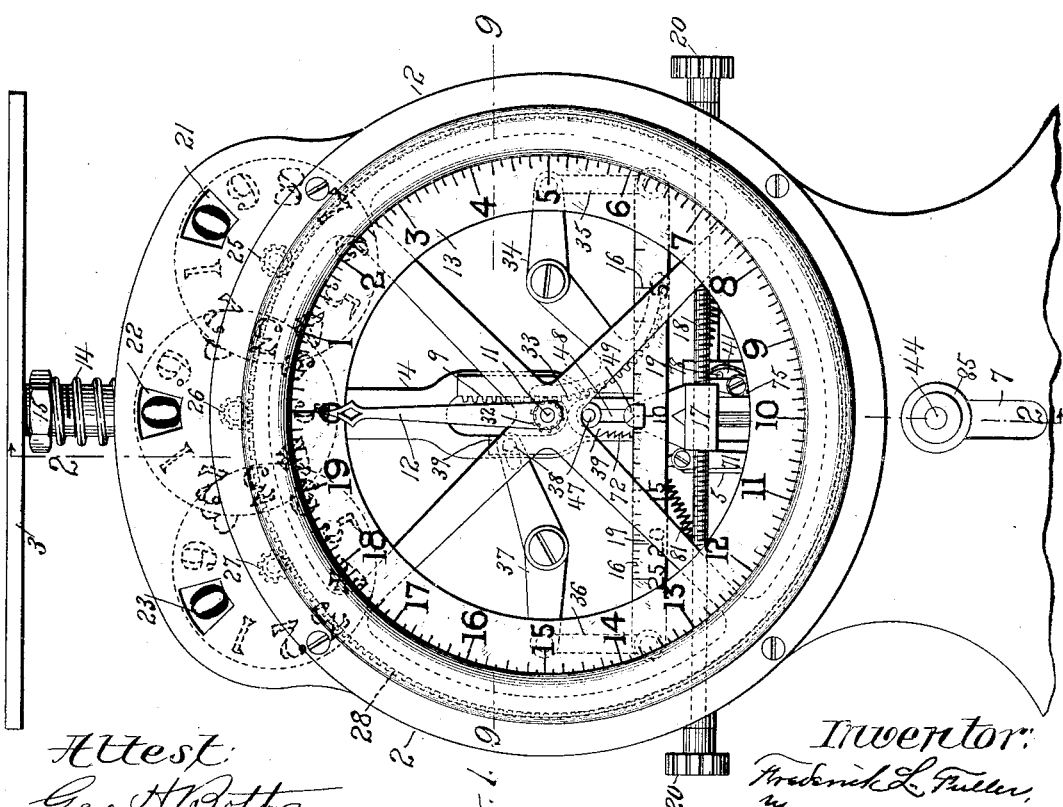
Attest:
Geo. H. Botts
J. J. Kennedy
Inventor:
Frederick L. Fuller,
by
Philipp Munson & Phelps,
Attys.

No. 639,551. Patented Dec. 19, 1899.
F. L. FULLER.
WEIGHING SCALE AND VALUE CALCULATING AND REGISTERING MECHANISM.
(Application filed Feb. 6, 1894. Renewed Nov. 10, 1898.)
(No Model.) 4 Sheets—Sheet 2.
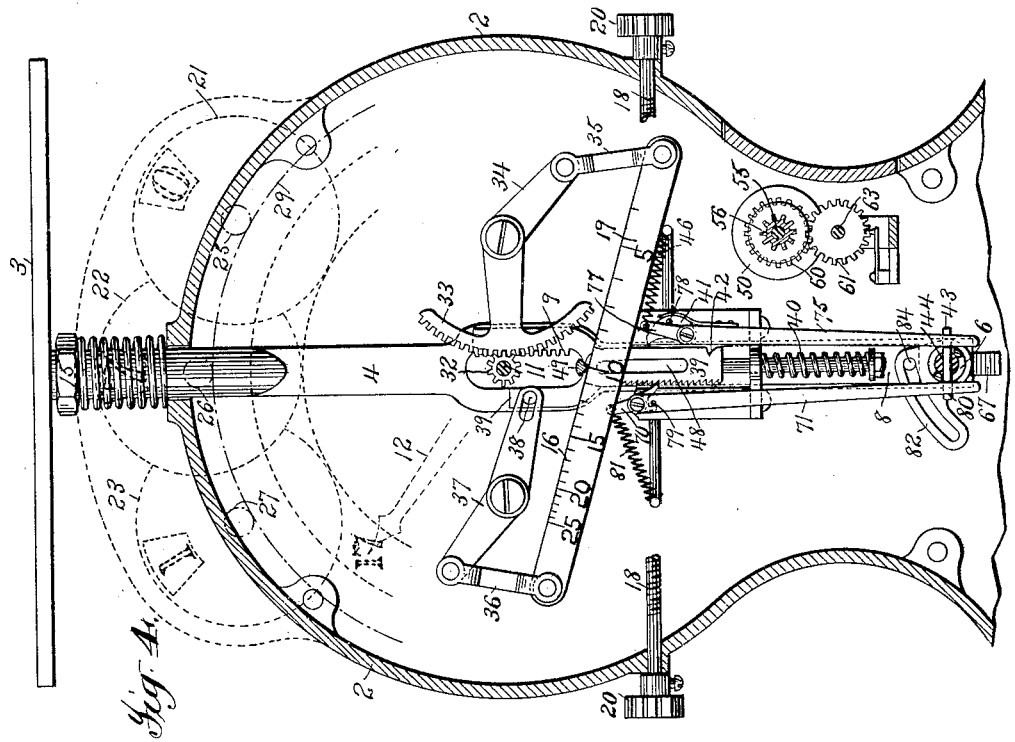
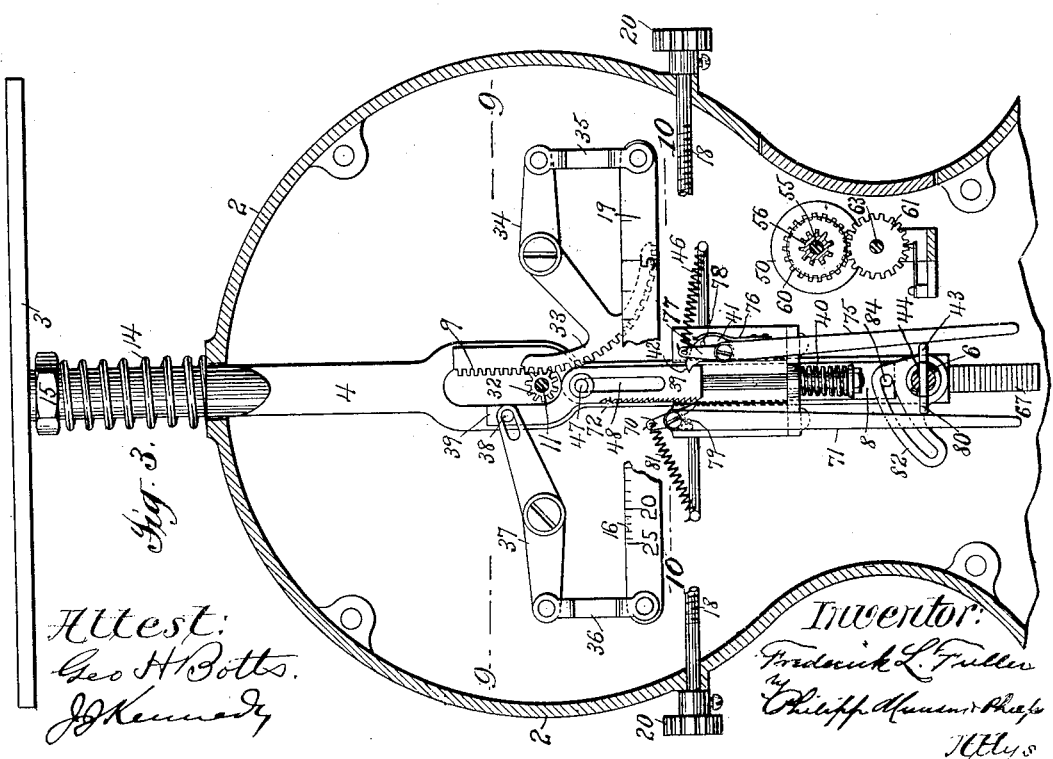
THE NORRIS PETERS CO., PHOTO-LITHO., WASHINGTON, D. C.

No. 639,551. Patented Dec. 19, 1899.
F. L. FULLER.
WEIGHING SCALE AND VALUE CALCULATING AND REGISTERING MECHANISM.
(Application filed Feb. 6, 1894. Renewed Nov. 10, 1898.)
(No Model.) 4 Sheets—Sheet 3.
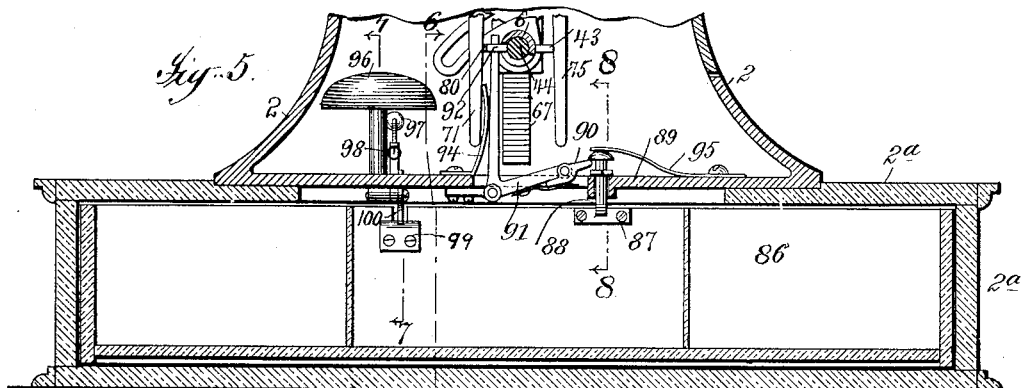
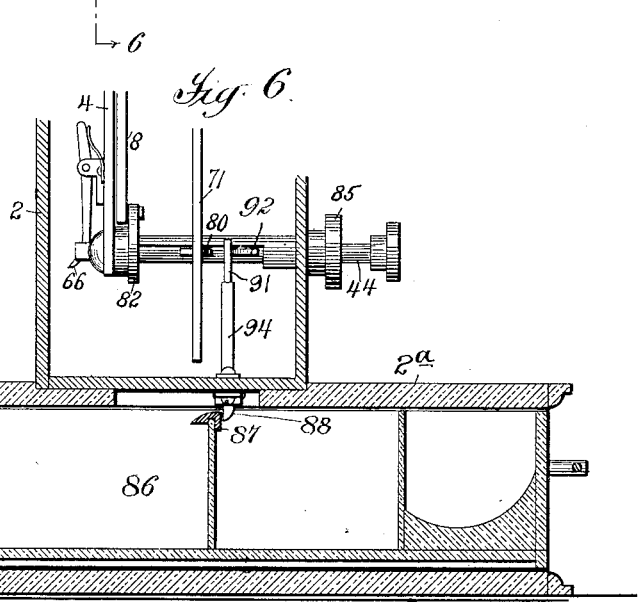
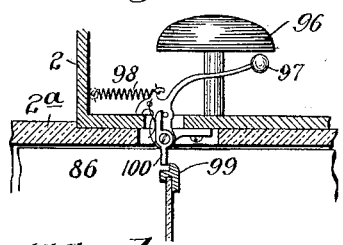 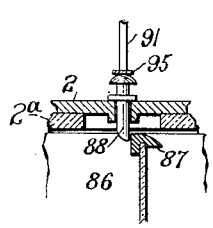
Inventor:
Frederick L. Fuller
by
Philipp Munson & Phelps
Attys

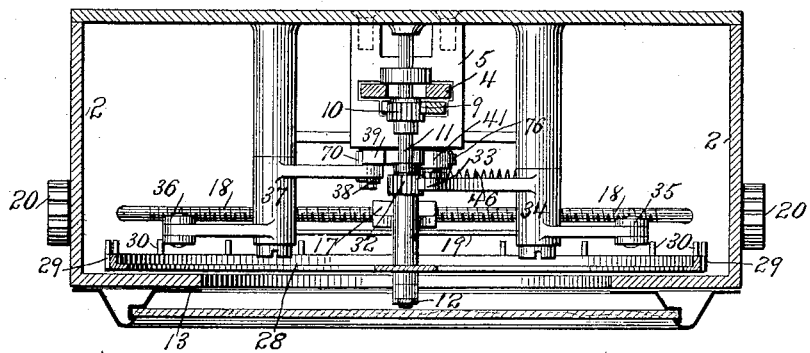

ns, Therefor, fully described and represent-# United States Patent Office.

FREDERICK L. FULLER, OF TRENTON, NEW JERSEY, ASSIGNOR, BY MESNE ASSIGNMENTS, TO THE UNION CASH REGISTER MANUFACTURING COMPANY, OF SAME PLACE.

WEIGHING-SCALE AND VALUE CALCULATING AND REGISTERING MECHANISM.

SPECIFICATION forming part of Letters Patent No. 639,551, dated December 19, 1899.

Application filed February 6, 1894. Renewed November 10, 1898. Serial No. 696,032. (No model.)

*To all whom it may concern:*

Be it known that I, FREDERICK L. FULLER, a citizen of the United States, residing at Trenton, county of Mercer, and State of New Jersey, have invented certain new and useful Improvements in Weighing-Scales and Value Calculating and Registering Mechanisms Therefor, fully described and represented in the following specification and the accompanying drawings, forming a part of the same.

This invention relates to improvements in weighing-scales and value-calculating and value-registering mechanism therefor.

The invention has for its object, primarily, the combining in one machine of mechanism for weighing the article and mechanism, suitably controlled in its movements relatively to the weight and unit price of the article weighed, for registering or registering and indicating the money value of each article so weighed. In the embodiment of this feature of the present invention hereinafter to be particularly described, in which the various mechanisms are shown in their preferred forms, there are provided a weighing mechanism which, except in the particulars hereinafter pointed out, is of ordinary construction, a value-registering mechanism of the total-adding form, a value-calculating mechanism connected to and actuating the registering mechanism, mechanism consisting of a spring for actuating the calculating mechanism, means for setting the calculating mechanism for operation in accordance with the unit price of the article weighed, and means for controlling the movement of the calculating mechanism, and through it the registering mechanism, in accordance with the weight of the article. There are also provided a money-drawer, a locking device therefor, means for operating said locking device to release the drawer, means, such as a spring, for throwing the drawer open when it is released, and an alarm mechanism operated by the drawer when thus thrown open. In addition to these mechanisms there are also provided means for locking the calculating mechanism, and through it the registering mechanism, against movement during the weighing operation, means for locking the weighing mechanism against further movement after the weighing operation is completed and the usual vibrations of the weighing mechanism have ceased, and means for preventing rebound of the calculating mechanism when released to prevent overregistration. The means for controlling the movement of the calculating and registering mechanisms in accordance with the weight of the article consist of stop mechanism controlled by the weighing mechanism, so as to engage and arrest the calculating mechanism in different positions, according to the weight of the article weighed. Except for this control according to weight which the weighing mechanism has over the calculating and registering mechanisms, the latter are each entirely independent in their operations of the weighing mechanism. In the operation of this construction the article is first weighed, and then when the vibrations of the weighing mechanism have ceased the latter is locked against further movement. The calculating mechanism, being first set or adjusted for operation in accordance with the unit price of the article, is then released and operated by its actuating mechanism and in turn operates the registering mechanism. The movement of the calculating mechanism continues until the stop mechanism referred to controlled by the weighing mechanism engages and arrests it. The calculating mechanism will preferably include indicators, and the setting mechanism will preferably act in conjunction with a scale indicating units of price, so as to indicate the price. With such indicators upon the completion of the operation as just described there will be exhibited the weight of the article, its price per pound or other unit, and its total value, which latter will also be transferred to the registering mechanism.

The separation of the operations of weighing and calculating and registering, as described, is of importance, as calculating and registering mechanisms thus operated are not affected by vibrations of the weighing mechanism, each of which would operate the registering mechanism and produce overregistration.

After the operations described have been completed the article weighed is removed from the receptacle, when the weighing mechanism, through the agency of a spring, is returned to normal position, with its stop mechanism still in engagement with the calculating mechanism, and returning that mechanism also to normal position, in which position it is then locked and disengaged from the weighing mechanism by the locking mechanism before referred to. The connections between the calculating mechanism and registering mechanism include a pawl engaging a ratchet, which during the restoration of the calculating mechanism rides idly over the ratchet without affecting the registry.

The invention has also for its object improvements in several of the mechanisms referred to independently of each other and of the combination outlined, which improvements will be hereinafter particularly pointed out.

As a full understanding of the improvements constituting the present invention can best be given by a detailed description of the same, all further preliminary description will be omitted and such description given in connection with the accompanying drawings, in which the weighing mechanism illustrated, which has been selected for convenience, is of the type known as "spring-balance," and in which—

Figure 1 is a face view of the machine with the base removed, illustrating particularly the weight-indicator, unit-price indicator, and portions of the weighing and calculating mechanisms and connected parts. Fig. 2 is a vertical section of the same on the line 2 2 of Fig. 1. Fig. 3 is a section on the line 3 3 of Fig. 2. Fig. 4 is a view similar to Fig. 3, illustrating the various mechanisms of the machine in the positions they occupy after a weighing and calculating operation. Fig. 5 is a cross-sectional elevation of the lower part of the machine beneath the weighing and calculating mechanism, illustrating particularly the drawer mechanism, its locking devices, the connections for releasing the latter, and the alarm mechanism operated by the drawer. Fig. 6 is a section of the same, taken on the line 6 6 of Fig. 5. Fig. 7 is a section on the line 7 7 of Fig. 5, showing the alarm mechanism. Fig. 8 is a section on the line 8 8 of Fig. 5, illustrating the locking mechanism. Fig. 9 is a section on the line 9 9 of Figs. 1 and 3. Fig. 10 is a section on the line 10 10 of Fig. 3. Fig. 11 is a section on the line 11 11 of Fig. 2. Figs. 12 and 13 are details of parts of the value-calculating mechanism and weighing mechanism, respectively. Fig. 14 is a detail of the registering mechanism and the connections between it and the value-calculating mechanism, and Fig. 15 is a detail illustrating a modification in the mechanism for actuating the value-calculating mechanism and the stop mechanism for arresting its movement.

Referring to said drawings, 2 represents a suitable casing containing the working parts of the several mechanisms.

The weighing mechanism consists of a platform or other suitable receptacle 3, and a rod 4, connected thereto and passing downwardly through a boss 5 within the casing 2 and connected at its lower end to a sleeve 6, located so as to be capable of vertical movement in a slot 7 in the front of casing 2. The sleeve 6 has connected to it an auxiliary rod 8, provided with a rack 9 at its upper end, engaging a pinion 10, fast upon a shaft 11, journaled in the casing 2. This weighing mechanism operates the usual pointer 12, fast upon the outer end of shaft 11, which upon the rotation of shaft 11 is moved over the face of dial 13, graduated to represent pounds and fractions thereof from "0" to "20." The receptacle 3 and parts connected thereto are retained in normal position and returned to that position after weighing by a spring 14, resting upon the top of the casing 2 and bearing against a nut 15, screw-threaded, so as to be capable of adjustment vertically on rod 4, as usual in this class of scales.

The operation of the mechanism thus far described is as follows: The article to be weighed being placed upon the platform 3, said platform is depressed against the pressure of spring 14 and the rod 4 moved downwardly by it a distance corresponding to the weight of the article. As the rod 4 is thus moved downwardly through the casing the sleeve 6, moving with it in the slot 7, will also draw the auxiliary rod 8 downwardly with it. As the rod 8 is thus moved its rack 9, engaging pinion 10, will rotate the latter, and through it the shaft 11, and thus move the pointer 12 over the face of the dial 13 from its normal or zero position to the numeral on said dial indicating the weight of the article upon the platform.

The price-indicating mechanism consists of a scale 16, graduated to represent cents or other units of value, and a nut having a screw-threaded connection with a rod 18, journaled in the casing 2 and provided with a pointer 17, adapted upon the rotation of said rod 18 to be moved across the face of the scale 16. This scale 16 may be placed in any suitable position; but in the present case, for convenience and economy, it is placed upon a swinging lever 19, which, as will hereinafter appear, forms part of the value-calculating mechanism. The rod 18 is for convenience of manipulation provided with knobs or handles 20. The operation of this mechanism is as follows: As shown in the drawings, pointer 17 is in position to indicate upon the scale 16 the unit price of the article to be weighed as ten cents. When it is desired to indicate the price of the article as less than ten cents, the rod 18 will be turned so as to draw pointer 17 from its "ten-cents" position toward the right to a lower numeral. If the price which it is desired to indicate exceeds ten cents, the rod 18 will be turned in the opposite direction, thus moving pointer 17 from the ten-cent mark toward the left to a higher numeral.

The value-calculating mechanism preferably includes indicators consisting of a series of disks 21 22 23, journaled upon studs 24 in the casing 2 and representing, respectively, units, tens, and hundreds, or cents, dimes, and dollars, each disk being numbered from "0" to "9." The disks 21 22 23 are placed one behind the other in the order named and are provided with pinions 25 26 27, respectively, which connect the disks with the calculating mechanism and which are set at gradually-increasing distances in the order named from the front of the casing 2 for a purpose which will be presently explained.

A gear-wheel 28, journaled upon shaft 11, is provided with three sets of teeth 29 30 31, for engagement, respectively, with the pinions 25 26 27. The gear 28 is provided with a pinion 32, engaged by a rack 33, connected to one end of a bell-crank 34, pivoted to the casing 2, the opposite end of which is in turn connected by a link 35 to one end of the swinging lever 19, heretofore referred to, the opposite end of which lever is in turn connected by a link 36 to one end of another bell-crank 37, the opposite end of which is provided with a slot which receives a pin 38, secured to an auxiliary rod 39, movable vertically in a guideway provided for it in the boss 5. The first or shorter set 29 of teeth on gear 28 extend entirely around the periphery of the gear 28 and engage the pinion 25 of the first or cents disk 21. The second or longer set 30, which occur one at each tenth tooth 29, are extensions of the teeth 29 and project beyond the face of the gear 28 into position to engage the pinion 26 of the second or dime disk 22, which, as before stated, is set back of the pinion 25. The third or longest set of teeth 31 occur at every tenth tooth 30, and therefore at every hundredth tooth 29, and are extensions of the teeth 30, projecting still farther beyond the face of gear 28 into position to engage the pinion 27 of the third or dollars disk 23. Although the teeth 30 31 are shown as extensions of the teeth 29, they may, if desired, be formed independently of the teeth 29 and consist of projections formed upon the inner face of the gear-wheel 28 or in any other suitable manner. From this arrangement of teeth and value-indicating disks it follows that to indicate eleven cents upon the disks the gear 28 will be rotated a distance equal to eleven teeth. This movement of the gear will rotate the cents-disk 21 one tooth in excess of a complete revolution, thus exposing one cent at the sight-opening, and through the tooth 30, occurring at the tenth tooth 29, rotate the dimes-disk 22 a distance equal to one tooth, thus exposing at the sight-opening of that disk the numeral "1," or, in other words, one dime, the total exposure on the two disks being eleven cents. If the value to be indicated is $1.11 the gear 28 will be rotated a distance equal to one hundred and eleven teeth, which will rotate the first or cents disk 21 one tooth in excess of eleven complete revolutions, the second or dimes disk 22 one tooth in excess of a complete revolution, and the third or dollar disk 23 one tooth, thus exposing at each of the said openings of each of these disks the numeral "1" or a total of the three disks of "$1.11." This calculating mechanism, which may be actuated in any suitable way usual in indicating and weighing machines, is shown in the present case as actuated by a spring 40, located between the lower headed end of rod 39 and the boss 5, which when the rod is raised to its normal position is compressed between the headed end of the rod and the boss 5, and which at the proper time propels rod 39 downwardly and thus operates the calculating mechanism.

Means are provided for retaining or locking the rod 39 in its normal or elevated position against the tendency of spring 40 to operate it, consisting of a detent 41, pivoted on boss 5 and engaging a notch 42 in rod 39. Fulcrumed upon the same pivot is a lever 75, which extends downwardly past the sleeve 6 and which is provided with a spring 76, engaging and holding the detent in one position of the lever in engagement with rod 39. The lever 75 is also provided with a tail 77, which engages in the other position of the lever a pin 78 upon the pawl and throws the latter out of engagement with rod 39. The lever 75 is moved to and held in the first position by means of a cam 43, formed upon or connected to a push-rod 44, inclosed by and movable longitudinally through sleeve 6, which cam engages the lower end of the lever. The lever 75 is moved to and held in the second position when disengaged from cam 43 by a spring 46, connected to the tail 77 and to the frame of the machine. The cam 43 is disengaged from the lever by moving push-rod 44 longitudinally inward, the spring 46 then rocking the tail 77 of the lever outward into engagement with pin 78.

The extent of movement of the value-calculating mechanism is limited or controlled in accordance with the weight of the article deposited in the receptacle 3 by a stop mechanism consisting of a pin 47, carried by one of the rods, (8 as shown,) which enters a slot 48 in the other rod, (39 as shown,) its normal position in the slot being at the upper end thereof. As the rod 8 descends with the rod 4 in weighing the pin 47 moves down in the slot 48 until the rod 4 comes to rest. The position of the pin 47, which is of course determined by the weight upon the platform, determines the extent to which the rod 39 may be propelled by its spring downwardly, and therefore the extent of movement of the other parts of the value-calculating mechanism, the pin 47 reëngaging the upper end of the slot 48 and arresting the rod 39 when propelled downwardly by its spring, as will more clearly appear from the description which will shortly be given of the operation of the value-indicating mechanism and its connections.

A setting mechanism is also provided for controlling the movement of the value-calculating mechanism in accordance with the unit price of the article weighed and a scale representing units of value by which to guide its movement. In the present case this scale is the unit-price-indicating scale, and the setting mechanism is connected to the pointer 17 of the scale, so that the two operations of indicating the unit price and setting the value-calculating mechanism for operation are performed simultaneously. The setting mechanism consists of a fulcrum 49, which, as shown, is integral with the nut or pointer 17 and rests upon the upper edge of the tilting lever 19 and is movable longitudinally thereof to vary the arc of movement of the lever. The upper edge of the lever 19 is provided with notches or serrations opposite the graduations on the scale 16 on the front face of said lever, which receive the knife-edge of fulcrum 49, the purpose of which notches or serrations (such as are provided for the poise on a scale-beam) being to prevent any possibility of slip between the lever 19 and said fulcrum when the value-calculating mechanism is operated.

The operation of the value-calculating mechanism and the mechanisms for controlling its operation in accordance with the weight and the unit price per pound of the article weighed will now be described.

As the various parts are shown in Figs. 1 and 3, they occupy their normal positions, with the exception of the pointer 17, which has been moved along the scale 16 to indicate ten cents as the unit price of the article to be weighed, carrying with it the fulcrum 49, the knife-edge of which takes into a notch in the upper edge of the lever 19 opposite the "10" mark at which the pointer 17 has come to rest. The unit price of the article is thus indicated and the value mechanism also set for operation in accordance with such price.

The operation is as follows: If we assume the unit price of the article which is placed upon the platform 3 to be ten cents and its weight to be seventeen pounds, the rods 4 and 8 will be moved downwardly by the weight of the article, in the manner heretofore described, to about the extent indicated in Fig. 4, the pointer 12, operated as heretofore described, being moved over the disk 13 to the numeral "17," thus indicating the weight of the article. During this movement of the rods 4 and 8 the pin 47 on the latter has been moved downwardly through the slot 48; but the rod 39 and its connected mechanism, still under the control of the detent 41, remain unaffected by such movement. After the weight has been thus indicated all that is necessary to be done to have the value calculated and indicated is to release the rod 39 from the control of detent 41. This is done by moving push-rod 44 inwardly through the sleeve 6 sufficiently to disengage the cam 43 from the lower end of lever 75. At the moment of such disengagement tail 77 of the lever being drawn by spring 46 into engagement with pin 78 will take the pawl 41 out of notch 42 of the rod 39, which will then be propelled through the boss 5 until the upper end of its slot 48 comes in contact with the pin or stop 47, which will then arrest it and prevent its further movement downward. As the rod 39 is thus moved it will, through its pin-and-slot connection with bell-crank lever 37, rock the outer end of said lever upwardly and through the link 36 swing the left-hand end of lever 19 upwardly and its right-hand end downwardly upon the fulcrum 49 to about the position indicated in Fig. 4. The lever 19 thus tilted will, through the link 35 and bell-crank 34, move the rack 33 upwardly, and thus rotate pinion 32 and through it the gear 28. The movement imparted to the gear 28 in the case of the sale assumed of seventeen pounds at ten cents per pound will be equal to one hundred and seventy teeth or one hundred and seventy cents. These one hundred and seventy teeth include seventeen dimes-teeth 30 and one dollar-tooth 31, and the first disk 21 will be rotated seventeen times, thus indicating "0," the second or dimes-disk 22 seven teeth in excess of a complete revolution, thus indicating "7," and the third or dollar-disk 23 one tooth, thus indicating "1," the total indication on the three disks being "$1.70."

When the several operations just described have been completed, the parts will be in about the position indicated in Fig. 4. To restore them to normal position, all that it is necessary to do is to remove the article weighed from the platform. The spring 14, relieved of its weight, will then extend itself and raise the platform and its rod 4 to their normal positions, the sleeve 6 and auxiliary rod 8 also rising with the rod 4. As the rod 8 is thus raised its rack 9 will rotate the pinion 10 and its shaft 11 and through them return the pointer 12 to zero. As the rod 4 is moved upwardly the pin 47 of rod 8, engaging the upper end of slot 48, will raise the rod 39, which through the connections described will swing the lever 19 back to horizontal position. This movement of the lever 19 will swing the segment 33 downward, rotating the gear 28 in a direction opposite to that heretofore described and to the same extent and through it rotating each of the disks 21 22 23 and returning each to its starting zero-point. Before the weight is removed from the platform, however, the detent 41 will be restored to position to engage and retain the rod 39 in its elevated position. This is done by withdrawing the shaft 44 through sleeve 6, so as bring its cam 43 again under the lower end of the lever 75, which is then again moved outward, throwing the detent 41 inwardly against the rod 39 in position to reëngage its notch 42. When the detent 41 and notch 42 are thus reëngaged, the scale is then ready for receiving the next article to be weighed.

The registering mechanism will now be described, it being understood that by "registering" mechanism is meant mechanism which makes a record of a number of sales, as the sales of a day or other period, the record thus made not being destroyed, but remaining upon the return of the operating parts and indicating devices to normal or zero position. The registering mechanism employed is preferably of the total-adding type consisting of a plurality of disks 50 51 52 53, loosely mounted upon a shaft 55 and each provided with numerals from "0" to "9," representing cents, dimes, dollars, and tens of dollars, respectively. The initial or cents disk 50 of the series is actuated from the gear 28 through connections consisting of a pinion 56, having ten teeth journaled upon shaft 55 and connected to a disk 57, carrying a pawl 58, engaging a ratchet 59, fast to a gear 60, connected to the initial or cents disk 50. The pawl 58 engages and rotates the ratchet 59 when gear 28 is rotated in actuating the disks 21 22 23 to make a value indication. During the return movement of the gear 28 the pawl 58 rides idly over the ratchet, the cents-disk 50 remaining in the position to which it was moved by the pawl 58. The connections for transferring motion from the cents-disk 50 to the dimes-disk 51 consist of gear 60, which has twenty teeth and which is rotated two teeth for every tooth in pinion 56 and which in turn correspondingly rotates a similar gear 61, connected to a sleeve 62, mounted loosely upon a shaft 63, carrying a finger 64, which at each complete revolution engages and rotates a gear 65, similar to gear 60, two teeth. The gear 65 is connected to the dimes-disk 51, and for every two teeth which it is rotated the dimes-disk is rotated one numeral. Motion is transferred from the dimes-disk to the dollars-disk and thence to the tens-of-dollars disk through connections similar to those just described between the disks 50 and 51, to which parts corresponding reference-numerals have been applied. The operation of this mechanism is as follows: In the case of the sale assumed in the description of the operation of the value calculating and indicating mechanisms the gear 28 being rotated a distance equal to one hundred and seventy teeth ($1.70) the pawl 58 will, through the ratchet, rotate disk 50 seventeen times, or one hundred and seventy teeth. Seventeen revolutions of the disk 50 will, through gear 61, pin 64, and gear 65, result in a movement of the disk 51 a distance equal to seven numerals in excess of one complete rotation and the complete rotation of the latter disk will result in a movement of disk 52 equal to one numeral. If each of the disks 50 51 52 was at zero when this movement was begun, there will be exposed on disk 52 the numeral "1," on disk 51 the numeral "7," and on disk 50 "0," or in all "$1.70." If the disks were not at zero, but showed, say, "$4.75" the "$1.70" would be added to this amount and there would be exposed on disk 52 the numeral "6," on the disk 51 the numeral "4," and on the disk 50 the numeral "5," or, in other words, "$6.45." With the four disks shown the total adding is limited to the amount of ninety-nine dollars and ninety-nine cents. This limit may be extended by adding to the number of disks, if desired.

As thus far described, the scale illustrated in the drawings provides mechanisms operative without addition to weigh the article, to indicate the unit price per pound of the article, to calculate and indicate its value, and to register the value of the sales of a day or week, &c. In addition, however, to these mechanisms devices are provided for locking the weighing mechanism in position against farther downward movement after completing the weighing operation and before the calculating operation is begun and for locking the calculating mechanism after its operation against return or rebound after an indication has been made.

As before remarked, the downward movement of the rod 39 of the indicating mechanism when released by pawl 41 is arrested by the pin 47, connected to the rod 8. The shock to the pin or stop 47 when the rod 39 is thrown against it, together with the weight of this rod and its connections and the pressure of spring 40, in some cases might tend to force the rod 8 downwardly beyond the position to which it has been moved by the weight upon the platform. This would result, first, in overindication of weight; second, overindication of value, and, third, overregistration of value. It is therefore important to provide means for preventing this and for preventing movement of the rod 8 under such circumstances. Mechanism is provided for this purpose consisting of a detent 66, pivoted on rod 4 and adapted when moved to position for that purpose to engage teeth 67, formed upon the inner wall of the casing 2 below the normal position of the rod 4. This detent 66 is held normally out of engagement with the teeth 67 by spring 68 under its upper end and is moved into engagement with teeth 67 by push-rod 44 when the latter is moved inwardly through sleeve 6 to release the value-indicating mechanism, the inner end of rod 44 being bifurcated and straddling the lower end of detent 66. When the detent 66 is in engagement with the teeth 67, the rod 4 is locked securely against further downward movement due to shock when the pin 47 is struck by the rod 39 or to the weight of rod 39 and the pressure of its spring 40. By preventing further movement of rod 4 the weight-pointer is held at the proper indication, and the movement of rod 39, controlled by pin 47, is also properly and positively limited and all possibility of overindication of weight and value and overregistration of value is thus avoided. In some cases, however, particularly when the rod 4 is depressed to a considerable extent, the rod 39 might rebound from the pin 47 or cause the rod 4 itself to rebound. The rebound of rod 39 would result in a partial return movement of gear 28 and disks 21 22 23 from indicating position and cause the pawl 58 to be retracted idly over the ratchet 59. When the rebound of rod 39 subsides and it is returning to position on the stop 47, the gear 28 will be rotated in indicating direction and return disks 21 22 23 to proper indicating position; but during this movement of the gear 28 the pawl 58, once more engaging the ratchet, will rotate the latter and the disks 50 51 52, &c., with the result of duplicating or partially duplicating the registration. Means are provided in the present case, however, for preventing this, consisting of detent 70, pivoted in the boss 5, which upon the downward movement of rod 39 is thrown into position to engage teeth 72, formed upon the side of rod 39 opposite that bearing the notch 42. This detent is controlled by a lever 71, provided with a pin 79, engaging the detent upon one side of its pivot, and a spring 81, connected to the opposite side of the detent and to the frame of the machine. The lever 71 is moved to and held in position to hold detent 70 out of engagement with the teeth 72 by a cam 80 upon push-rod 44. When the cam 80 is disengaged from lever 71 by moving push-rod 44 inwardly, the spring 81 is free to throw the detent 70 into position to engage the teeth 72. It will be noticed that the lever 71 is so mounted with relation to the lever 75 that the detent 70, controlled by the former, is thrown out of engagement with rod 39 as the detent 41 is thrown into engagement with said rod, and vice versa. When the rod 39 is thrown downwardly by its spring 40 therefor, the detent 70 at the moment the rod 39 is arrested by the pin 47 will engage the tooth 72 next below it, and thus prevent rebound of the rod 39.

In addition to its function of locking the rod 39 against rebound the detent 70, through the engagement of rod 39 with pin 47 on rod 8, locks the latter and rod 4 also against rebound, which is of importance, as if after detent 66 is moved into engagement with the teeth 67 the rod 4 should rebound it is possible that the detent might take into a higher tooth, and thus hold the pointer 12 at a numeral indicating less than the actual weight of the article upon the platform and to the same extent also falsify the value indication and registration.

A further improvement is illustrated in the drawings, which has so far not been referred to, but which will now be described.

Many articles to be weighed are of such a character as to necessitate their being weighed in baskets, cans, or other receptacles, the weight of which receptacles, &c., is of course not to be charged against the purchaser. In ordinary weighing-scales the weight of the receptacle being ascertained such weight can of course be deducted from the indicated weight, including the receptacle and its contents, and if value-indicating mechanism be employed the value of the contents can be arrived at by deducting from the indicated value, which includes the receptacle and its contents, a sum equal to the known weight of the receptacle multiplied by the unit value per pound of the contents. This is unsatisfactory, because it is troublesome, consumes time, and is liable to lead to mistakes to the injury of the proprietor or purchaser. Where registering or adding mechanism is employed, also when the receptacle and its contents are weighed together and no means is provided for limiting the movement of the weighing mechanism or the value mechanism in accordance with the weight of the contents alone, the registering mechanism is actuated in accordance with the weight of both the receptacle and its contents, and thus makes an overregistry of value or weight, as the case may be, if weight-registering mechanism be employed or of both where both value and weight registering mechanisms are employed. In the case of such overregistration the trouble is of course more serious, as such registration cannot be rectified as readily as overindication of weight or value. One of the objects of the present invention is to overcome this difficulty. Where, as in the present case, registering mechanism is employed, whether to register weight or, as in the present case, to register values, the movement of such registering mechanism being controlled by the weighing mechanism, this result is accomplished by rendering that part of the weighing mechanism which controls the movement of the registering mechanism and which, as in the present case, actuates the movable part of the weight-indicating mechanism movable independently of the weight-receptacle, so that it may, after a can or other receptacle has been weighed, be adjusted back to normal position, (carrying back with it the movable part of the indicating mechanism to zero,) so that when the contents of the can or other receptacle are weighed the adjustable part of the weighing mechanism will actuate the movable part of the indicating mechanism and will arrest the movement of the calculating mechanism in accordance with the weight of the contents, irrespective of the weight of the can or other receptacle. The mechanism shown in the present case for accomplishing this result consists of a cam 82, connected to sleeve 6 and provided with a slot engaging a pin 84 in the lower end of rod 8, which rod is capable of movement longitudinally on rod 4 upon the rotation of cam 82. The operation of this shifting mechanism is as follows: When a receptacle and its contents are to be weighed together, the receptacle, minus its contents, is placed upon the platform 3. Its weight will depress the rods 4 and 8 and through the rack 9 and pinion 10 move the pointer 12 over the dial 13 to the graduation representing its weight. The operator will then, through the knob 85, rotate the sleeve 6 and through the cam 82 raise the rod 8 (the rod 4 remaining stationary) until through the rack and pinion 9 10 it has returned the pointer 12 to zero. As the rod 8 is thus moved upward to zero position it will also restore the pin 47 to its starting-point. The articles which the receptacle is to contain being then placed within it, the rod 4 will be again depressed, drawing downwardly with it the rod 8 and the stop-pin 47. The rod 8, however, having been shifted upward upon the rod 4, as just described, to compensate for the weight of the receptacle, the pointer 12 will only indicate the weight of the contents of such receptacle, and the pin 47, being also correspondingly shifted, will limit the movement of the value-calculating mechanism and through it the registering mechanism in accordance with the weight of the contents. By the provision of such shifting mechanism, therefore, the weight and value of the contents of a receptacle alone are indicated, and the value or weight added to the registering mechanism is that alone of such contents. While this shifting mechanism has been designed, primarily, for the purposes described, it will be found equally useful for the purpose of "truing" the scale should the weighing mechanism get out of adjustment, whether calculating or registering mechanisms, or both, be employed or not. In the case of ordinary weighing-scales or in the case of weighing-scales with which is combined value-calculating mechanism that member of the indicating mechanism which is stationary with reference to the part actuated by the weighing mechanism may be rendered adjustable relatively to the movable member for the purpose of returning the indicating mechanism to zero position after a receptacle has been weighed or for the purpose of truing the scale should it get out of adjustment.

Referring now particularly to Figs. 5 to 8, the drawer, its locking mechanism, the releasing mechanism for the latter, and the alarm mechanism for announcing the opening of the drawer will be described. The drawer 86 is located in the lower casing 2ª of the machine beneath the casing 2, containing the parts of the machine heretofore described, and is provided with a locking-plate 87 in one of its cross-partitions, which when the drawer is closed is engaged at its forward edge by a locking-bolt 88, supported in a strip 89, extending across the base of the casing 2. The head of the locking-bolt 88 is engaged by a pawl 90, pivoted to one end of a bell-crank 91, fulcrumed in the strip 89, the upper end of which is adapted to be engaged by a cam 92, carried by push-rod 44, so as to raise the locking-bolt 88 upon the inward movement of push-rod 44 out of engagement with plate 87, and thus release the drawer. Between the drawer 86 and the rear of the casing 2ª is located a spring 93, compressed by the inward movement of the drawer, which when the locking-bolt 88 is disengaged from the plate 87, as just described, propels the drawer outwardly, so that access may be had to its contents. The bell-crank lever 91 is held in position for engagement by cam 92 by a spring 94, secured to the strip 89 and engaging the outer face of the free arm of the bell-crank, as shown in Fig. 5. The operation of this mechanism is as follows: Upon the inward movement of the push-rod 44 to lock the weighing mechanism and release the calculating mechanism, as heretofore described, the cam 92, engaging bell-crank 91, will throw its lower arm upward, and thus through the pawl 90 raise the locking-bolt 88 out of engagement with plate 87. When the locking-bolt has reached this position, the pawl 90 will be withdrawn from under the head of the locking-bolt and permit the latter to be returned to normal or locking position in the path of movement of plate 87, either by gravity or, as preferred, by a spring 95, connected to the strip 89 and engaging the head of the locking-bolt 88. Upon the return movement of the drawer by hand the rear end of the plate 87 will engage the forward face of the bolt 88 and raise the latter against the tension of its spring 95 until it has passed the same, when the locking-bolt will be thrown into engagement with the plate 87 by its spring 95.

The alarm mechanism consists of bell 96 and a bell-hammer 97, which is held in normal position by spring 98 and the lever of which projects downwardly into the path of movement of a plate 99, connected to one of the partitions of the drawer, so as to be tripped by the latter to strike the bell when the drawer is thrown outwardly by its spring 93.

In the modification illustrated in Fig. 15 that end of the spring 40 for actuating the calculating mechanism which in the preceding figures was confined above the head of rod 39 is connected to the sleeve 6, so that when the latter is moved downwardly in the operation of weighing the spring 40 will be put under tension by the weighing mechanism, so as to actuate the calculating mechanism when it is released, as before described. In this figure also is illustrated another modification in the means for controlling the movement of the calculating mechanism in accordance with the weight of the article weighed. In this figure the positions of the pin 47 and slot 48 are reversed from those of the preceding figures, the pin being connected to the rod 39 and engaging the lower end of a slot in the rod 8.

In the drawings the different mechanisms and the connections between the same are shown in what are now considered their preferred forms. For these, however, any others suitable for the purposes described may be substituted, if desired, without departing from the invention.

What is claimed is—

1. The combination with weighing mechanism, of value-registering mechanism whereby a record is made and retained of the amount of a number of sales, mechanism for operating the same and means for controlling the movement of the registering mechanism in accordance with the weight and unit price of the article weighed, substantially as described.

2. The combination with weighing mechanism, of value-registering mechanism inactive during the weighing operation, mechanism for actuating the same, and means for controlling the movement of the registering mechanism in accordance with the weight and unit price of the article weighed, substantially as described.

3. The combination with weighing mechanism, of value-registering mechanism, means for locking it against movement during the weighing operation, mechanism for actuating the registering mechanism when released, and means for controlling the movement of the registering mechanism in accordance with the weight and unit price of the article weighed, substantially as described.

4. The combination with weighing mechanism, of value-registering mechanism, mechanism for actuating the same independently of the weighing mechanism, and means for controlling the movement of the registering mechanism in accordance with the weight and unit price of the article weighed, substantially as described.

5. The combination with weighing mechanism, of value-registering mechanism, mechanism for actuating the same, means for controlling the movement of the registering mechanism in accordance with the unit price of the article weighed, and means controlled by the weighing mechanism for controlling the movement of the registering mechanism in accordance with the weight of the article weighed, substantially as described.

6. The combination with weighing mechanism, of value-registering mechanism, mechanism for actuating the same, means for controlling the movement of the registering mechanism in accordance with the unit price of the article weighed, means for locking the weighing mechanism against further movement when the weighing operation is completed, and means controlled by the weighing mechanism for controlling the movement of the registering mechanism in accordance with the weight of the article weighed, substantially as described.

7. The combination with weighing mechanism, of value-registering mechanism inactive during the weighing operation, actuating mechanism therefor, means for controlling the movement of the registering mechanism in accordance with the unit price of the article weighed, and means controlled by the weighing mechanism for controlling the movement of the registering mechanism in accordance with the weight of the article weighed, substantially as described.

8. The combination with weighing mechanism, of value-registering mechanism inactive during the weighing operation, actuating mechanism therefor, means for controlling the movement of the registering mechanism in accordance with the unit price of the article weighed, means for locking the weighing mechanism against further movement when the weighing operation is completed, and means controlled by the weighing mechanism for controlling the movement of the registering mechanism in accordance with the weight of the article weighed, substantially as described.

9. The combination with weighing mechanism, of value-registering mechanism, means for locking it against movement during the weighing operation, mechanism for actuating the registering mechanism when released, means for controlling the movement of the registering mechanism in accordance with the unit price of the article weighed, and means controlled by the weighing mechanism for controlling the movement of the registering mechanism in accordance with the weight of the article weighed, substantially as described.

10. The combination with weighing mechanism, of value-registering mechanism, mechanism for actuating the same, independently of the weighing mechanism, means for controlling the movement of the registering mechanism in accordance with the unit price of the article weighed, and means controlled by the weighing mechanism for controlling the movement of the registering mechanism in accordance with the weight of the article weighed, substantially as described.

11. The combination with weighing mechanism, of value-registering mechanism, mechanism for actuating the same independently of the weighing mechanism, means for controlling the movement of the registering mechanism in accordance with the unit price of the article weighed, means for locking the weighing mechanism against further movement when the weighing operation is completed, and means controlled by the weighing mechanism for controlling the movement of the registering mechanism in accordance with the weight of the article weighed, substantially as described.

12. The combination with weighing mechanism, of value-calculating mechanism, inactive during the weighing operation, value-registering mechanism actuated thereby, mechanism for actuating the calculating mechanism, and means for controlling the movement of the calculating mechanism in accordance with the weight and unit price of the article weighed, substantially as described.

13. The combination with weighing mechanism, of value-calculating mechanism, value-registering mechanism actuated thereby, mechanism for actuating the calculating mechanism independently of the weighing mechanism and means for controlling the movement of the calculating mechanism in accordance with the weight and unit price of the article weighed, substantially as described.

14. The combination with weighing mechanism, of value-calculating mechanism, mechanism for actuating said calculating mechanism independently of said weighing mechanism, setting mechanism for setting the calculating mechanism for operation in accordance with the unit price of the article weighed, value-registering mechanism actuated by the calculating mechanism, and stop mechanism controlled by the weighing mechanism for arresting the movement of the calculating mechanism in accordance with the position of the weighing mechanism, substantially as described.

15. The combination with weighing mechanism, of value-calculating mechanism, mechanism for actuating said calculating mechanism independently of said weighing mechanism, setting mechanism for setting the calculating mechanism for operation in accordance with the unit price of the article weighed, value-registering mechanism actuated by the calculating mechanism, means for locking the weighing mechanism against further movement when the weighing operation is completed, and stop mechanism controlled by the weighing mechanism for arresting the movement of the calculating mechanism in accordance with the position of the weighing mechanism, substantially as described.

16. The combination with weighing mechanism, of value-calculating mechanism, mechanism for actuating said calculating mechanism independently of said weighing mechanism, setting mechanism for setting the calculating mechanism for operation in accordance with the unit price of the article weighed, value-registering mechanism actuated by the calculating mechanism, and means for effecting the engagement of said weighing and calculating mechanisms to arrest the movement of the latter in accordance with the position of the former, substantially as described.

17. The combination with weighing mechanism, of value-calculating mechanism, mechanism for actuating said calculating mechanism independently of said weighing mechanism, setting mechanism for setting the calculating mechanism for operation in accordance with the unit price of the article weighed, value-registering mechanism actuated by the calculating mechanism, means for locking the weighing mechanism against further movement when the weighing operation is completed, and means for effecting the engagement of said weighing and calculating mechanisms to arrest the movement of the latter in accordance with the position of the former, substantially as described.

18. The combination with weighing mechanism, of value-calculating mechanism, actuating mechanism therefor, setting mechanism for setting the calculating mechanism, for operation in accordance with the unit price of the article weighed, value-registering mechanism actuated by said calculating mechanism, mechanism for locking the calculating mechanism against movement during the weighing operation, and stop mechanism controlled by the weighing mechanism for arresting the movement of the calculating mechanism in accordance with the position of the weighing mechanism, substantially as described.

19. The combination with weighing mechanism, of value-calculating mechanism, actuating mechanism therefor, setting mechanism for setting the calculating mechanism for operation in accordance with the unit price of the article weighed, mechanism for locking the calculating mechanism from movement during the weighing operation, value-registering mechanism actuated by the calculating mechanism, means for locking the weighing mechanism against further movement when the weighing operation is completed, and stop mechanism controlled by the weighing mechanism for arresting the movement of the calculating mechanism in accordance with the position of the weighing mechanism, substantially as described.

20. The combination with weighing mechanism, of value-calculating mechanism, actuating mechanism therefor, setting mechanism for setting the calculating mechanism for operation in accordance with the unit price of the article weighed, mechanism for locking the calculating mechanism from movement during the weighing operation, value-registering mechanism actuated by the calculating mechanism, and means for effecting the engagement of the weighing and calculating mechanisms to arrest the movement of the latter in accordance with the position of the former, substantially as described.

21. The combination with weighing mechanism, of value-calculating mechanism, actuating mechanism therefor, setting mechanism for setting the calculating mechanism for operation in accordance with the unit price of the article weighed, mechanism for locking the calculating mechanism from movement during the weighing operation, value-registering mechanism actuated by the calculating mechanism, means for locking the weighing mechanism against further movement when the weighing operation is completed, and means for effecting the engagement of the weighing and calculating mechanisms to arrest the movement of the latter in accordance with the position of the former, substantially as described.

22. The combination with weighing mechanism, of value-calculating mechanism, means for actuating the same independently of the weighing mechanism, and stop mechanism controlled by the weighing mechanism for arresting the movement of the calculating mechanism.

23. The combination with weighing mechanism, of value-calculating mechanism, means for actuating the same independently of the weighing mechanism, and means for effecting the engagement of the weighing and calculating mechanisms when the latter is operated, substantially as described.

24. The combination with weighing mechanism, of calculating mechanism, a detent for locking it against movement during the weighing operation, a spring for operating the calculating mechanism when released, and means for controlling the movement of the calculating mechanism in accordance with the weight and unit price of the article weighed, substantially as described.

25. The combination with weighing mechanism, of calculating mechanism, value-registering mechanism actuated thereby, a detent for locking the calculating mechanism against movement during the weighing operation, a spring for operating the calculating mechanism when released, and means for controlling the movement of the calculating mechanism in accordance with the weight and unit price of the article weighed, substantially as described.

26. The combination with weighing mechanism, of calculating mechanism, a detent for locking it against movement during the weighing operation, a spring for operating the calculating mechanism when released, means for controlling the movement of the calculating mechanism in accordance with the weight and unit price of the article weighed, and means for preventing rebound of the calculating mechanism, substantially as described.

27. The combination with weighing mechanism, of calculating mechanism, value-registering mechanism actuated thereby, a detent for locking the calculating mechanism against movement during the weighing operation, a spring for operating the calculating mechanism when released, means for controlling the movement of the calculating mechanism in accordance with the weight and unit price of the article weighed, and means for preventing rebound of the calculating mechanism, substantially as described.

28. The combination with weighing mechanism, of calculating mechanism, a detent for locking it against movement during the weighing operation, a spring for operating the calculating mechanism when released, a detent for locking the weighing mechanism against further movement when the weighing operation is completed and stop mechanism controlled by the weighing mechanism for arresting the movement of the calculating mechanism in accordance with the position of the weighing mechanism, substantially as described.

29. The combination with weighing mechanism, of calculating mechanism, a detent for locking it against movement during the weighing operation, a spring for operating the calculating mechanism when released, a detent for locking the weighing mechanism against further movement when the weighing operation is completed, stop mechanism controlled by the weighing mechanism for arresting the movement of the calculating mechanism in accordance with the position of the weighing mechanism, and means for preventing rebound of the calculating mechanism, substantially as described.

30. The combination with weighing mechanism, of calculating mechanism, value-registering mechanism actuated thereby, a detent for locking the calculating mechanism against movement during the weighing operation, a spring for operating the calculating mechanism when released, a detent for locking the weighing mechanism against further movement when the weighing operation is completed and stop mechanism controlled by the weighing mechanism for arresting the movement of the calculating mechanism in accordance with the position of the weighing mechanism, substantially as described.

31. The combination with weighing mechanism, of calculating mechanism, value-registering mechanism actuated thereby, a detent for locking the calculating mechanism against movement during the weighing operation, a spring for operating the calculating mechanism when released, a detent for locking the weighing mechanism against further movement when the weighing operation is completed, stop mechanism controlled by the weighing mechanism for arresting the movement of the calculating mechanism in accordance with the position of the weighing mechanism, and means for preventing rebound of the calculating mechanism, substantially as described.

32. The combination with weighing mechanism, of calculating mechanism, a detent for locking it against movement during the weighing operation, a spring for operating the calculating mechanism when released, a detent for locking the weighing mechanism against further movement when the weighing operation is completed, and means for effecting the engagement of the weighing and calculating mechanisms to arrest the movement of the latter in accordance with the position of the former, substantially as described.

33. The combination with weighing mechanism, of calculating mechanism, a detent for locking it against movement during the weighing operation, a spring for operating the calculating mechanism when released, a detent for locking the weighing mechanism against further movement when the weighing operation is completed, means for effecting the engagement of the weighing and calculating mechanisms to arrest the movement of the latter in accordance with the position of the former, and means for preventing rebound of the calculating mechanism, substantially as described.

34. The combination with weighing mechanism, of calculating mechanism, value-registering mechanism actuated thereby, a detent for locking the calculating mechanism against movement during the weighing operation, a spring for operating the calculating mechanism when released, a detent for locking the weighing mechanism against further movement when the weighing operation is completed, and means for effecting the engagement of the weighing and calculating mechanisms to arrest the movement of the latter in accordance with the position of the former, substantially as described.

35. The combination with weighing mechanism, of calculating mechanism, value-registering mechanism actuated thereby, a detent for locking the calculating mechanism against movement during the weighing operation, a spring for operating the calculating mechanism when released, a detent for locking the weighing mechanism against further movement when the weighing operation is completed, means for effecting the engagement of the weighing and calculating mechanisms to arrest the movement of the latter in accordance with the position of the former, and means for preventing rebound of the calculating mechanism, substantially as described.

36. The combination with weighing mechanism, of value-calculating mechanism, mechanism for actuating the same independently of the weighing mechanism, and means for controlling the movement of the calculating mechanism in accordance with the weight and unit price of the article weighed, substantially as described.

37. The combination with weighing mechanism, of value-calculating mechanism, inactive during the weighing operation, means for actuating the calculating mechanism and means for controlling the movement of the calculating mechanism in accordance with the weight and unit price of the article weighed, substantially as described.

38. The combination with weighing mechanism, of value-calculating mechanism, means for locking the calculating mechanism against movement during the weighing operation, mechanism for actuating the calculating mechanism when released, and means for controlling the movement of the calculating mechanism in accordance with the weight and unit price of the article weighed, substantially as described.

39. The combination with weighing mechanism, of value-calculating mechanism independent of the weighing mechanism during the weighing operation, mechanism for actuating the same, means for restoring the weighing mechanism to zero position, and connections between the weighing and calculating mechanisms for simultaneously restoring the latter to zero position, substantially as described.

40. The combination with weighing mechanism, of value-calculating mechanism independent of the weighing mechanism during the weighing operation, mechanism for actuating the same, means for restoring the weighing mechanism to zero position, connections between the weighing and calculating mechanisms for simultaneously restoring the latter to zero position, and a locking device for locking the calculating mechanism in zero position, substantially as described.

41. The combination with weighing mechanism, of value-calculating mechanism, mechanism for operating the same, mechanism for locking the calculating mechanism against movement during the weighing operation and means operating simultaneously to lock the weighing mechanism when the weighing operation is completed and release the calculating mechanism, substantially as described.

42. The combination with weighing mechanism, of value-calculating mechanism, mechanism for operating the same, mechanism for locking the calculating mechanism against movement during the weighing operation, means operating simultaneously to lock the weighing mechanism when the weighing operation is completed and release the calculating mechanism, and stop mechanism controlled by the weighing mechanism for arresting the movement of the calculating mechanism, substantially as described.

43. The combination with weighing mechanism, of value-calculating mechanism, mechanism for operating the same, mechanism for locking the calculating mechanism against movement during the weighing operation, means operating simultaneously to lock the weighing mechanism when the weighing operation is completed and release the calculating mechanism, and means for effecting the engagement of the weighing and calculating mechanisms to arrest the movement of the latter, substantially as described.

44. The combination with weighing mechanism, value-calculating mechanism including a lever, and means for actuating the calculating mechanism independently of the weighing mechanism, of a movable fulcrum for the lever for varying the arc of movement of the lever, and means for controlling the extent of movement of the lever, substantially as described.

45. The combination with weighing mechanism, value-calculating mechanism including a lever, and means for actuating the calculating mechanism independently of the weighing mechanism, of a movable fulcrum for the lever for varying the arc of movement of the lever, and means controlled by the weighing mechanism for controlling the extent of movement of the lever, substantially as described.

46. The combination with weighing mechanism calculating mechanism including a lever, and means for actuating the calculating mechanism independently of the weighing mechanism, of a movable fulcrum for said lever for varying the arc of movement of the lever, and a scale bearing graduations representing units of price by which to guide the movement of the fulcrum, substantially as described.

47. The combination with weighing mechanism and value-calculating mechanism including a lever, of a movable fulcrum for said lever for varying its movement in accordance with the unit price of the article weighed, a scale by which to regulate the movement of the fulcrum, bearing graduations arranged at progressively-decreasing distances from each other in the direction in which the fulcrum moves to increase the movement of the lever, and means for actuating the lever in accordance with the weight of the article weighed, substantially as described.

48. The combination in a calculating mechanism, of lever 19 provided with graduations representing units of price, actuating mechanism connected with one end of said lever, gearing connected with and actuated by the other end thereof a movable fulcrum 49 engaging the lever, screw-threaded rod 18 and connections between said rod and fulcrum for actuating the fulcrum, substantially as described.

49. The combination of lever 19, its movable fulcrum 49, actuating mechanism connected to one end of said lever, segment 33 connected to the opposite end of said lever, indicating devices and gearing connecting said segment and indicating devices, substantially as described.

50. The combination of lever 19, its movable fulcrum 49, actuating mechanism connected to one end of said lever, segment 33 connected to the opposite end of said lever, gear 28 rotated thereby and indicating devices actuated by said gear, substantially as described.

51. The combination of lever 19, its movable fulcrum 49, actuating mechanism connected to one end of said lever, segment 33 connected to the opposite end of said lever, indicating and registering devices, and gearing connecting said segment and indicating and registering devices, substantially as described.

52. The combination of lever 19, its movable fulcrum 49, actuating mechanism connected to one end of said lever, segment 33 connected to the opposite end of said lever, gear 28 rotated thereby, and indicating and registering devices actuated by said gear, substantially as described.

53. The combination of lever 19, its movable fulcrum 49, actuating mechanism connected to one end of said lever, segment 33 connected to the opposite end of said lever, indicating devices actuated thereby, detent 41 for normally locking said lever against movement, and means for arresting its movement when released and operated, substantially as described.

54. The combination with rod 4 of the weighing mechanism, and rod 39 of the calculating mechanism, of spring 40 for actuating said rod 39, a detent for restraining the movement of said rod, and a pin 47 for arresting the movement of rod 39 in accordance with the position of the rod 4, substantially as described.

55. The combination with rod 4 of the weighing mechanism, and rod 39 of the calculating mechanism, of spring 40 for actuating said rod 39, a detent for restraining the movement of said rod, a pin 47 for arresting the movement of rod 39 when released and operated in accordance with the position of the rod 4, and a detent engaging said rod 39 when it is arrested to prevent rebound, substantially as described.

56. The combination with rod 4, detent 66, teeth 67 engaged thereby, rod 39, spring 40 for operating said rod 39, detent 41 for restraining the movement of said rod, rod 44 and connections for operating said detents 66 and 41 respectively to lock the rod 4 and release the rod 39, substantially as described.

57. The combination with rod 4, detent 66, teeth 67 engaged thereby, rod 39, spring 40 for operating said rod 39, detent 41 for restraining the movement of said rod, rod 44 and connections for operating said detents 66 and 41 respectively to lock the rod 4 and release the rod 39, and pin 47 for arresting the movement of the latter, substantially as described.

58. The combination with rod 39 and spring 40 for actuating the same, the detents 41, 70 engaging the rod 39, springs 46 and 81 connected to said detents, rod 44 and connections for simultaneously operating said detents, substantially as described.

59. The combination with rod 4, and rod 39, spring 40 for actuating the latter, detent 66, teeth 67 engaged thereby, detents 41, 70 engaging the rod 39, springs 46, 81 connected to said detents, and rod 44 for simultaneously operating all of said detents, substantially as described.

60. The combination with rod 4, and rod 39, spring 40 for actuating the latter, detent 66, teeth 67 engaged thereby, detents 41, 70 engaging the rod 39, springs 46, 81 connected to said detents and rod 44 having cams 43, 80 for simultaneously operating all of said detents, substantially as described.

61. The combination with rod 4, rack 9 connected to said rod, shaft 11, pinion 10 connecting said shaft and rack, rod 39, spring 40 for actuating the same, pin 47 between said rods 4 and 39 for limiting the movement of the rod when actuated by its spring, gear 28 and mechanism actuated thereby and connections between said gear and rod 39, substantially as described.

62. The combination with vertically-moving rod 4 of the weighing mechanism and weight-indicator actuated thereby, vertically-moving rod 39 calculating mechanism actuated thereby, and means for actuating the latter independently of the weighing mechanism, a pin carried by one rod and a slot in the other for connecting the two when the rod 39 has been actuated, substantially as described.

63. The combination with gear 28 provided with a plurality of sets of peripheral teeth of varying lengths, a corresponding number of sets of disks provided with pinions rotating in vertical planes distances from each other in accordance with the variations in the length of the teeth, and means for rotating the gear, substantially as described.

64. The combination with gear 28 provided with peripheral teeth, as 29 &c., disks 21 &c., provided with pinions 25 &c., respectively, engaging the teeth 29 &c., respectively, substantially as described.

65. The combination with a weight-receptacle and an indicator actuated thereby, of connections adjustably connecting said receptacle and indicator to permit movement of the latter independently of the former, a casing inclosing said connections, and means extending outside said casing for operating said connections to adjust the indicator, value-calculating mechanism, mechanism for actuating the same and stop mechanism controlled by said connections and engaging said calculating mechanism, substantially as described.

66. The combination with a weight-receptacle and a weight-indicator, of connections between the two comprising a member connected to the receptacle and a member for operating the indicator adjustably connected to the first member, value-calculating mechanism, mechanism for actuating the same and stop mechanism controlled by the second member and engaging said calculating mechanism.

67. The combination with a weight-receptacle and a weight-indicator, of connections between the two comprising a member connected to the receptacle and a member for operating the indicator adjustably connected to the first member, value-calculating mechanism, mechanism for actuating the same and stop mechanism controlled by the second member and engaging said calculating mechanism, and a cam for actuating the second member, substantially as described.

68. The combination with a weight-receptacle, of a rod 4 connected thereto, an indicator, a rod 8 connected to the indicator, connections between the two rods permitting movement of the rod 8 independently of rod 4, and a cam carried by one of the rods and engaging the other for thus moving the rod 8, substantially as described.

69. The combination with a weight-receptacle, of a rod 4 connected thereto, an indicator, a rod 8 connected to the indicator, connections between the two rods permitting movement of the rod 8 independently of rod 4, and a cam carried by one of the rods and engaging the other for thus moving the rod 8, a casing inclosing the rods, and means extending outside the casing for actuating the cam, substantially as described.

70. The combination with a weight-receptacle, of rod 4 connected thereto, an indicator, a rod 8 connected to the indicator and a pin and slotted-cam connection between the two rods, substantially as described.

71. The combination with a weight-receptacle, of rod 4 connected thereto, an indicator, a rod 8 connected to the indicator, connections between the two rods permitting movement of the rod 8 independently of rod 4, and a cam carried by one of the rods and engaging the other for thus moving the rod 8, rod 39 of the calculating mechanism, and a pin-and-slot connection between it and the rod 8, substantially as described.

72. The combination with a weight-receptacle, of rod 4 connected thereto, an indicator, a rod 8 connected to the indicator, connections between the two rods permitting movement of the rod 8 independently of rod 4, and a cam carried by one of the rods engaging the other for thus moving the rod 8, value-calculating mechanism, and a pin-and-slot connection between it and the rod 8, substantially as described.

73. The combination with weighing mechanism, of value-calculating mechanism, value-registering mechanism actuated thereby, a drawer, mechanism for locking the same, and mechanism for releasing said locking mechanism, substantially as described.

74. The combination with weighing mechanism, of value-calculating mechanism, mechanism for actuating said calculating mechanism independently of said weighing mechanism, means controlled by the weighing mechanism for arresting the movement of the calculating mechanism, locking mechanism for locking the weighing mechanism against movement, a drawer, locking mechanism therefor, and means for operating said locking mechanisms, substantially as described.

75. The combination with weighing mechanism, of value-calculating mechanism, mechanism for actuating said calculating mechanism independently of said weighing mechanism, means controlled by the weighing mechanism for arresting the movement of the calculating mechanism, locking mechanism for locking the weighing mechanism against movement, a drawer, locking mechanism therefor, locking mechanism for locking the calculating mechanism against movement during the weighing operation, and means for operating said locking mechanisms to lock the weighing mechanism and release the calculating mechanism and drawer, substantially as described.

76. The combination with weighing mechanism, of value-calculating mechanism, mechanism for actuating said calculating mechanism independently of said weighing mechanism, means controlled by the weighing mechanism for arresting the movement of the calculating mechanism, a locking mechanism for locking the weighing mechanism against movement, a drawer, locking mechanism therefor, locking mechanism for locking the calculating mechanism against movement during the weighing operation, and a push-rod and connections for operating said locking mechanisms to lock the weighing mechanisms and release the calculating mechanism and drawer, substantially as described.

77. The combination with rod 4 of the weighing mechanism, mechanism for locking it against movement, rod 39 of the calculating mechanism, mechanism for locking it against movement, a spring for operating said rod 39, a drawer, locking mechanism therefor, of push-rod 44 and connections for operating said locking mechanisms to lock the weighing mechanism and release the calculating mechanism and drawer, substantially as described.

78. The combination with rod 4 of the weighing mechanism, mechanism for locking it against movement, rod 39 of the calculating mechanism, mechanism for locking it against movement, a spring for operating said rod 39, a drawer, locking mechanism therefor, of push-rod 44 and connections for operating said locking mechanisms to lock the weighing mechanism and release the calculating mechanism and drawer, and means for propelling the drawer when released, substantially as described.

79. The combination with rod 4 of the weighing mechanism, mechanism for locking it against movement, rod 39 of the calculating mechanism, mechanism for locking it against movement, a spring for operating said rod 39, a drawer, locking mechanism therefor, of push-rod 44 and connections for operating said locking mechanisms to lock the weighing mechanism and release the calculating mechanism and drawer, means for propelling the drawer when released, and an alarm mechanism, substantially as described.

In testimony whereof I have hereunto set my hand in the presence of two subscribing witnesses.

FREDERICK L. FULLER.

Witnesses:
   J. HARRY BARNSLEY,
   M. E. JOHNSON.